This invention relates to apparatus for and a method of severing a hollow conduit and substantially simultaneously sealing the severed portions thereof, and more particularly, to apparatus and a method advantageously utilizing explosively actuated means for achieving this end.

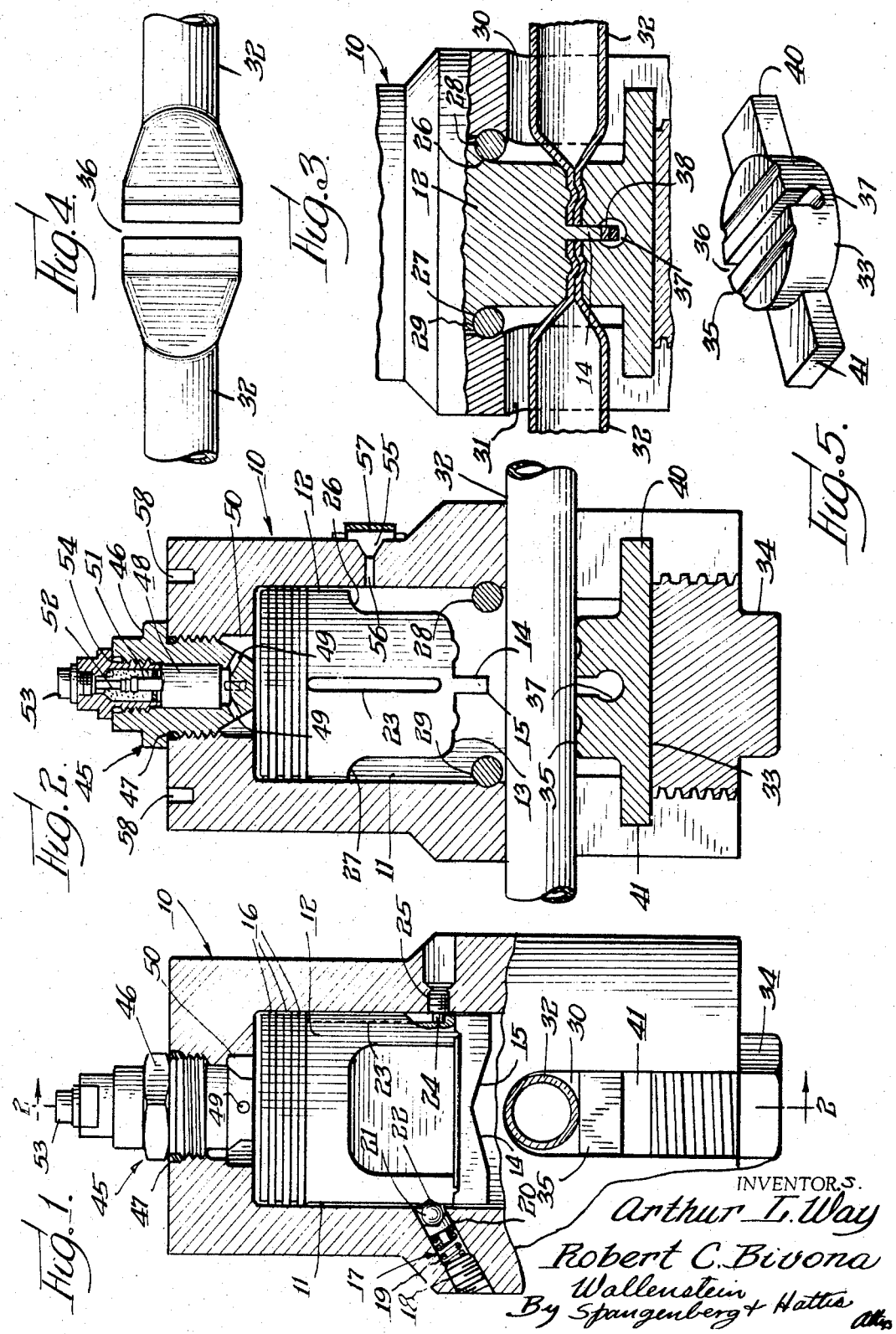
Aug. 2, 1966  A. L. WAY ET AL  3,263,465
APPARATUS FOR AND METHOD OF SEVERING
AND SEALING HOLLOW CONDUIT
Filed Dec. 14, 1961
INVENTORS.
Arthur L. Way
Robert C. Bivona
By Spangenberg & Hattis Wallenstein
Attys 3,263,465
APPARATUS FOR AND METHOD OF SEVERING AND SEALING HOLLOW CONDUIT
Arthur L. Way, 25 Claude Ave., Denville, N.J., and Robert C. Bivona, Clifton Road, Milton, N.J.
Filed Dec. 14, 1961, Ser. No. 159,334
9 Claims. (Cl. 72—48)

There are numbers of instances wherein it is desirable to stop the flow of materials through hollow conduit as quickly as possible to avoid injury to personnel and/or damage to equipment and property. In many cases, for practical reasons, means in the form of valves cannot be positioned at every point within a fluid system to achieve the desired immediate and positive cutoff of fluid flow.

A less frequently encountered, but important, example of an instance where quick stoppage of fluid flow is imperative can be found in atomic reactor installations. The conduits of such a system carry as the coolant highly radioactive molten sodium. During an emergency shut down of the installation it is critical that the flow of this potentially dangerous and difficult to handle material through the conduits be discontinued at the earliest possible moment. This invention makes possible, simply, surely and highly effectively, immediate flow cutoff by severing of the conduit and sealing of the severed ends thereof to prevent seepage and/or spillage of the molten sodium. Situations similar to the foregoing, but in other fields, wherein such measures are called for will suggest themselves to those in the art.

It is the primary object of this invention to provide novel and improved apparatus which will positively and effectively sever hollow conduit and substantially simultaneously seal the severed portions thereof in a single operation.

It is another object of this invention to provide novel and improved compact, portable apparatus for severing and sealing in a single operation hollow conduit which apparatus can be utilized in substantially any position in substantially any type fluid flow system.

It is also an object of this invention to provide novel and improved apparatus for severing and sealing in a single operation hollow conduit which apparatus is relatively lightweight, easily operated, simple in construction and fool proof in its action.

It is still another object of this invention to provide a novel and improved method of effecting substantially immediate cessation of flow of a fluid through hollow conduit while achieving substantially simultaneously the sealing of the respective resulting severed ends of the conduit.

Briefly, these and other objects are achieved with apparatus comprising a housing or body member having means for receiving a hollow conduit, said housing or body member being desirably adapted to carry both a pressurized gas actuated piston, advantageously formed at one end with a male die member and hollow conduit severing means, and an anvil provided with a cooperating female die member and means for registering with the conduit severing means. The anvil is adapted to be received by the conduit receiving means in the housing or body member and is movable therein by the action of an anvil supporting member desirably in threadable engagement with the housing or body member. The piston with the associated male die member and conduit severing means is communicatively and operatively positioned with respect to means in the housing or body member for generating a pressurized charge of gas which propels the piston toward the female die. The force with which the piston is driven by the gas is sufficient in magnitude to enable the complementary portions of the apparatus to sever the hollow conduit and substantially simultaneously to crimp and seal the severed ends thereof.

The details of a particularly preferred embodiment of this invention are set forth hereafter with reference to the appended specification and claims taken in conjunction with the drawings in which:

FIG. 1 is a fragmentary side elevational view, partly in section, of the apparatus.

FIG. 2 is a longitudinal sectional view taken substantially along line 2—2 of FIG. 1.

FIG. 3 is a fragmentary sectional view of the apparatus as illustrated in FIG. 2 showing portions of a hollow metal conduit in the apparatus after the severing and sealing operation.

FIG. 4 is a plan view of the severed and sealed portions of the conduit resting on the anvil.

FIG. 5 is a perspective view of the anvil.

Referring to the drawings, a typical embodiment of the apparatus of this invention comprises a housing or body member designated generally at 10. The housing or body member 10 is provided with a cylindrical cavity or bore 11 containing a pressurized gas responsive piston 12 advantageously formed at one end with a male die member 13. The die member 13 may be releasably secured to the end of the piston 12, or it can be formed integrally with the piston 12 as illustrated in FIG. 2. Associated with the male die member 13, and desirably integral with the piston 12, is a blade or severing member 14 advantageously provided with a notched shearing edge 15.

To contain the pressurized gases directed against it, the piston 12 is preferably provided with piston rings 16 which desirably are fabricated of a durable metal such as steel. Utilization of rings of this character substantially reduces wear and thereby prolongs the useful life of the apparatus.

The piston 12 may suitably be maintained in an operative position in the cylindrical cavity or bore 11 by means of a detent assembly, designated generally at 17, mounted in the housing or body member 10 and comprising threaded retaining member 18, compression spring 19, actuator 20 and ball 21, the entire assembly coacting to urge a portion of the periphery of the ball 21 into cooperative engagement with a notch 22 in the piston 12. Desirably the force exerted by the spring 19 is sufficient to overcome gravitational forces acting on the piston 12 but is counteracted by any substantial pressurized gas charge exerted on the piston 12.

Any tendency of the piston 12 to turn in the cylindrical cavity or bore 11, and thus bring the associated male die member 13 and severing member 14 into disalignment with cooperating means in the housing or body member 10, may be conveniently eliminated by providing the piston 12 with a guideway or groove 23 adapted to engage with the reduced end portion 24 of a stop screw 25 suitably secured in the housing or body member 10.

In order to prevent the piston 12 from being inadvertently ejected from the cylindrical cavity or bore 11 when the apparatus is not performing its intended function, the piston 12 is advantageously provided with grooved or chamfered sections 26 and 27 adapted to receive stop pins 28 and 29 suitably anchored in the housing or body member 10. This arrangement eliminates the possibility of the piston 12 becoming a damaging projectile in the event of accidental actuation thereof while the apparatus is being transported or positioned for use.

The housing or body member 10 especially desirable is provided with opposed axial openings which may be more conveniently referred to as slots 30 and 31, adapted to receive, for example, a hollow metal conduit 32. This enables the apparatus to be operatively positioned on hollow metal conduit in substantially any position and in substantially any location in a fluid system. The width of the slots 30 and 31 will vary in accordance with the size of the conduit in the system wherein the apparatus is to be utilized. The length thereof is such that the conduit 32 will be brought into proximity to the piston 12.

The conduit 32 is advantageously secured or clamped in the slots 30 and 31 by means of an anvil 33 and an anvil supporting member 34. The anvil 33 is desirably formed with a female die member 35 and a channel 36 which cooperate with the male die member 13 and the blade or severing member 14 to sever the hollow metal conduit 32 and substantially simultaneously effect plastic deformation thereof to crimp and effectively seal the severed portions of the conduit. The channel 36 registers with the blade or severing member 14 and may conveniently be provided with an enlarged base 37 adapted to receive the piece of metal conduit or slug 38 removed from the conduit during the severing operation. This adaptation enables the slug 38 to be readily extracted from the channel 36.

The anvil is further advantageously provided with transversely disposed extensions or wings 40 and 41 which are adapted to be received by the slots 30 and 31. This especially desirable arrangement permits the anvil 33 to be moved in the slots 30 and 31 into abutting relation to the hollow metal conduit 32 while preventing the female die member 35 and the channel 36 from becoming disaligned with respect to cooperating male die member 13 and blade or severing member 14 of the piston 12.

Movement of the anvil 33 in relation to the conduit 32 desirably is effected by anvil supporting member 34 which advantageously is in threadable engagement with the housing or body member 10. This feature of the invention permits the anvil 33 to be urged into contact with the conduit 32 thereby rigidly and securely clamping the latter in the slots 30 and 31 of the housing or body member 10.

Actuation of the piston 12 and completion of the desired severing, crimping and sealing operation on the hollow metal conduit 32 is especially advantageously achieved by impacting the piston 12 with a pressurized charge of gas. To accomplish this, the housing or body member 10 desirably is provided with an explosive cartridge assembly, designated generally at 45. The assembly 45 preferably comprises a cartridge retaining member 46 which desirably is threadedly engaged with the housing or body member 10. Suitable sealing means such as gasket 47 may be provided for the member 46 to insure against escape of pressurized gases to the atmosphere.

The cartridge retaining member 46 advantageously is formed with a breech bore 48 communicating through passageways 49 in the member 46 with a pressurized gas chamber 50 disposed above and adjacent to the piston 12. The member 46 is adapted to receive suitable explosive means such as cartridge 51 capable, upon detonation, of generating a charge of pressurized gas sufficient to propel the piston 12 at a high velocity toward the conduit 32. In the typical embodiment of the apparatus of this invention illustrated in the drawings, the cartridge 51 is designed to threadedly engage with the retaining member 46, and is provided with electrical detonating means 52 connected to a terminal post 53 to which a lead to a source of electric current, not shown, may be attached. A gastight seal may be suitably effected between the cartridge 51 and the cartridge retaining member 46 by means of a gasket 54. It is to be understood, of course, that firing of the cartridge can be accomplished in any desired manner, other than electrically, known in the art, and that the apparatus of this invention is not limited to the utilization of electrical detonating means. It is also to be understood that the size of the cartridge employed may be varied in accordance with the dimensions of the hollow conduit to be worked upon by the apparatus.

To permit the pressurized gases to escape to the atmosphere following actuation of the piston 12, and thereby prevent any possibility of a build-up of gas pressures therebehind, the housing or body member 10 may be conveniently provided with a gas relief port 55 communicating with cylindrical cavity 11 through transverse bore 56. A deflector cap 57 may be suitably fitted over the relief port 55 is desired.

In utilizing the apparatus of this invention, hollow metal tubing such as conduit 32 is secured and clamped in the slots 30 and 31 of the housing or body member 10 through the coaction of anvil 33 and anvil supporting member 34. The cartridge 51 is then detonated. The force of the pressurized gases generated thereby is sufficient to depress ball detent assembly 17 and drive the piston 12 toward the anvil 33, severing, in its course of travel, the conduit 32 and substantially simultaneously crimping and sealing the thus severed sections thereof through the cooperative action of the complementary portions of the male die member 13 and the female die member 35. The action is quick, positive and reliable. The cleavage of the conduit is clean, and the seals of the severed sections thereof are mechanically strong and can withstand substantially high liquid hydrostatic pressures. The apparatus may be conveniently re-set for another operation by manually raising the piston to the point of its engagement with the ball detent assembly, and replacing the discharged cartridge.

Although the lightweight and compactness of the apparatus enables it to be transported and manipulated with substantial facility and ease, the portability of the apparatus may be advantageously augmented by providing the housing or body member 10 with tapped borings 58 adapted to receive, for example, eye bolts, not shown, to which suitable carrying means may be attached thereby permitting the apparatus to be toted conveniently by one hand of the operator.

While this invention has been described in relation to an especially preferred embodiment thereof, in its broadest aspects it contemplates and encompasses modifications in construction and arrangement of parts which will enable it to perform, for example, solely a crimping and sealing operation by elimination of the severing means, or, in the alternative, the severing only of conduit by appropriate changes in the complementary portions of the apparatus. Further, actuation of the apparatus may be achieved by means other than a pressurized charge of gas such as, for example, hydraulically. We do not limit ourselves, therefore, to the exact form herein shown and described other than by the appended claims.

What is claimed is:

1. Apparatus for sealing a hollow conduit, comprising a body member having open ended slot means for laterally receiving the hollow conduit, means including a die portion and a conduit supporting member movably positioned in the body member on opposite sides of the conduit for sealing the conduit, said supporting member being movable toward the conduit in the open ended slot means of the body member to cause the conduit to be clamped therein, and means for propelling the die portion at a high velocity into cooperative relation to the supporting member to seal the conduit.

2. Apparatus for completely severing a hollow conduit and substantially simultaneously sealing the severed portions thereof, comprising a body member having open ended slot means for laterally receiving the hollow conduit, means including male and female dies movably positioned in the body member for severing and crimping and sealing the hollow conduit, one of the dies being movably positioned toward the conduit in the open ended slot means of the body member to cause the conduit to be clamped therein, and means for propelling at a high velocity the other die into cooperative relation with said first die to sever and crimp and seal the conduit.

3. Apparatus for completely severing a hollow conduit and substantially simultaneously sealing the severed portions thereof, comprising a body member having open ended slot means for laterally receiving the hollow conduit, means including male and female die portions movably positioned in the body member, the die portions being provided with means for severing and crimping the hollow metal conduit when brought together in cooperative relation, one of said die portions being movable toward the conduit in the open ended slot means of the body member to cause the conduit to be clamped therein, and means for propelling the other die portion for bringing the male and female die portions into said cooperative relation.

4. Apparatus for completely severing a hollow conduit and substantially simultaneously sealing the severed portions thereof, comprising a body member having open ended slot means for laterally receiving the hollow conduit, a male and a femal die movably carried by the body member on opposite sides of the hollow conduit, means for movably positioning the female die toward the hollow conduit for clamping the hollow conduit in the open ended slot means, means for propelling the male die into cooperative relation with the female die, and means on the male die and the female die for completely severing the secured hollow conduit and for substantially simultaneously crimping and sealing the severed ends thereof.

5. Apparatus for completely severing a hollow conduit and substantially simultaneously sealing the severed portions thereof, comprising a body member having open ended slots in the walls thereof for laterally receiving the hollow conduit, a male and a female die movably carried by the body member on opposite sides of the hollow conduit in the slots of the body member, means including a support member for the female die for urging the female die toward and into abutting relation with the conduit to thereby clamp the conduit in the slots of the body member, means for propelling at a high velocity the male die into cooperative relation with the female die, and means on the male die and the female die for completely severing the clamped hollow metal conduit and for substantially simultaneously crimping and sealing the severed ends thereof.

6. Apparatus for completely severing a hollow conduit and substantially simultaneously sealing the severed portions thereof, comprising a body member having opposed open ended slots in the walls thereof for laterally receiving the hollow conduit, a male and female die movably carried by the body member on opposite sides of the hollow conduit, means including a supporting member for the female die for urging the female die toward and into abutting relation with the conduit to thereby clamp the conduit in the slots of the body member, means for propelling at a high velocity the male die toward the female die, and means on the male die and the female die for completely severing the clamped hollow conduit and for substantially simultaneously crimping and sealing the severed ends thereof.

7. Apparatus for completely severing a hollow conduit and substantially simultaneously sealing the severed portions thereof, comprising a body member having opposed open ended slots in the walls thereof for laterally receiving the hollow conduit, a piston provided at one end with a male die, a female die, the piston and the female die being movably carried by the body member on opposite sides of the hollow conduit, a supporting member for the female die threadedly engaged with the body member for urging the female die toward and into abutting relation with the conduit to thereby clamp the conduit in the slots of the body member, means including a cartridge for explosively actuating the piston toward the female die, and means including a severing edge on the male die cooperating with means on the female die for completely severing the clamped hollow conduit and for substantially simultaneously crimping and sealing the severed ends thereof.

8. Apparatus for completely severing a hollow conduit and substantially simultaneously sealing the severed portions thereof, comprising a body member having opposed open ended slots in the walls thereof for laterally receiving the hollow conduit, a pressurized gas responsive piston formed at one end with a male die, a female die, the piston and the female die being movably carried by the body member on opposite sides of the hollow conduit, a supporting member for the female die threadedly engaged with the body member for urging the female die toward and into abutting relation with the conduit to thereby clamp the conduit in the slots of the body member, a cartridge capable of explosively generating a pressurized charge of gas operatively communicating with the piston for propelling the piston toward the female die, and means including an integral blade on the male die cooperating with means including a blade receiving slot in the female die for completely severing the clamped hollow conduit and for substantially simultaneously crimping and sealing the severed ends thereof when the piston is propelled toward the female die by the pressurized gas from the cartridge.

9. Apparatus for completely severing a hollow metal conduit and substantially simultaneously sealing the severed portions thereof, comprising a body member having opposed open ended slots in the walls thereof for laterally receiving the hollow metal conduit, a pressurized gas responsive piston formed at one end with means for severing and crimping the conduit, said means including raised portions integral with the piston and a blade member disposed therebetween, an anvil formed at one end with recessed portions substantially corresponding in dimensions to the raised portions on the piston and having a channel with an enlarged base disposed therebetween, the piston and the anvil being movably carried by the body member on opposite sides of the hollow metal conduit, a supporting member for the anvil threadedly engaged with the body member for urging the anvil toward and into abutting relation with the conduit to thereby clamp the conduit in the slots of the body member, means including a cartridge for explosively actuating the piston to bring the associated raised portions and blade thereof into operative relation with respect to the recessed portions and channel of the anvil whereby the hollow metal conduit is completely severed and the severed sections thereof are substantially simultaneously crimped and sealed.

References Cited by the Examiner

UNITED STATES PATENTS

| | | |
|---|---|---|
| 2,003,843 | 6/1935 | Temple. |
| 2,285,099 | 6/1942 | Specht _____ 153—48 |
| 2,716,813 | 9/1955 | Smyres. |
| 2,776,473 | 6/1957 | Dailey et al. _____ 29—543 |

CHARLES W. LANHAM, *Primary Examiner.*

R. D. GREFE, *Assistant Examiner.*